US006452960B1

(12) United States Patent
Sato

(10) Patent No.: US 6,452,960 B1
(45) Date of Patent: Sep. 17, 2002

(54) AUDIO DATA TRANSMISSION APPARATUS AND METHOD, AUDIO DATA RECORDING APPARATUS, AND AUDIO DATA RECORDING MEDIUM

(75) Inventor: Hideo Sato, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/027,372

(22) Filed: Feb. 20, 1998

(30) Foreign Application Priority Data

Mar. 3, 1997 (JP) ............................................ 9-048283

(51) Int. Cl.[7] ............................................ H04L 27/30

(52) U.S. Cl. ....................... 375/140; 375/130; 375/141; 375/143; 370/212

(58) Field of Search ................................ 375/130, 140, 375/141, 143, 146, 147, 152, 216; 370/495, 494, 493, 214, 212; 379/93.01, 93.08, 93.26, 93.28, 93.31; 360/60; 348/484; 380/54

(56) References Cited

U.S. PATENT DOCUMENTS

| | | | | | |
|---|---|---|---|---|---|
| 5,212,551 | A | * | 5/1993 | Conanan | 348/484 |
| 5,319,735 | A | * | 6/1994 | Preuss et al. | 704/205 |
| 5,473,631 | A | * | 12/1995 | Moses | 375/130 |
| 5,646,940 | A | * | 7/1997 | Hotto | 370/496 |
| 5,724,340 | A | * | 3/1998 | Jones et al. | 370/203 |
| 5,761,292 | A | * | 6/1998 | Wagner et al. | 379/229 |
| 5,774,452 | A | * | 6/1998 | Wolosewicz | 370/212 |
| 5,822,360 | A | * | 10/1998 | Lee et al. | 375/140 |
| 5,915,027 | A | * | 6/1999 | Cox et al. | 380/54 |

* cited by examiner

*Primary Examiner*—Stephen Chin
*Assistant Examiner*—Shuwang Liu
(74) *Attorney, Agent, or Firm*—Frommer Lawrence & Haug LLP; William S. Frommer; Bruno Polito

(57) ABSTRACT

An audio data transmission and recording system and a recording medium according to the system. Gaps in the audio data are used to control the addition of spectrum-diffused data to the audio data. The gaps are also used to control demodulation of the spectrum-diffused data.

40 Claims, 16 Drawing Sheets

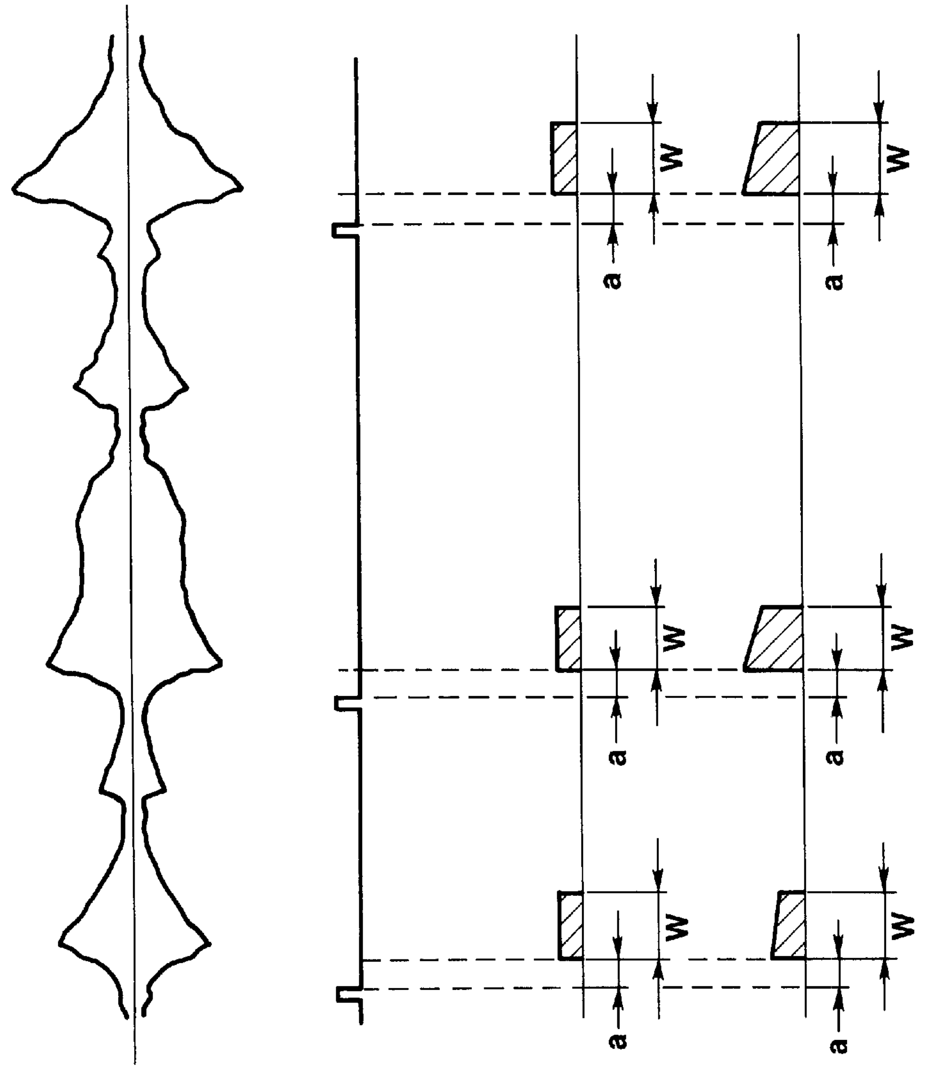
FIG.10A AUDIO SIGNAL (ENVELOPE)
FIG.10B GAP SIGNAL (START PULSE)
FIG.10C SPECTRUM DIFFUSION SIGNAL
FIG.10D SPECTRUM DIFFUSION SIGNAL

AUDIO DATA TRANSMISSION APPARATUS AND METHOD, AUDIO DATA RECORDING APPARATUS, AND AUDIO DATA RECORDING MEDIUM

BACKGROUND OF THE INVENTION

1. Field of the Invention

The present invention relates to an audio data transmission apparatus and method for transmitting, over audio data, additional information such as a copy inhibit control signal and an author right information for tracing an unauthorized copy; an audio data recording apparatus for recording the audio data which has been received; and an audio data recording medium containing the additional information overwritten on the audio data.

2. Description of the Prior Art

Recently, the use of digital audio apparatuses such as a compact disc (CD) player and a so-called mini disc (MD) using a small-size optical disc has become widespread, enabling users to easily reproduce an audio signal of a high quality.

On the other hand, however, a lot of music software may be copied without a limit and various copy prevention methods have been suggested.

Especially in the case of the aforementioned digital audio, the audio signal is not deteriorated through copying, which makes copy prevention very important. In the case of the aforementioned digital audio, a copy inhibit control signal consisting of a copy inhibit symbol or a copy generation limit symbol as well as an author right data are additionally recorded in additional to a digital audio signal on a recording medium, so as to prevent copying or to trace a recording medium copied using an authorized data.

However, when a digital audio signal is converted into an analog audio signal, the aforementioned additional digital data is not contained in the analog audio signal, making it impossible to prevent illegal copying or trace unauthorized copying.

To cope with this, it is desired to overlap the aforementioned additional information in an analog audio signal. However, it has been quite difficult to overlap an additional information on an analog audio signal without deteriorating the audio signal S/N ratio, although such a technique of overlapping an additional information is expected to enable a novel service in the information-oriented society.

To cope with this, a spectrum diffusion method is considered for overlapping an additional information. This method is preferable for overlapping a plenty of data, but when used for an audio signal, it is impossible to obtain a sufficient band width and it has been difficult to realize in the field of music source and the like which requires to maintain a high S/N ration.

Moreover, in order to carry out spectrum diffusion on an audio signal, there arises a problem of synchronization. Firstly, in an audio signal, it is necessary to provide a significantly long periodicity so as to obtain a sufficient S/N ratio, and a long time is required if an ordinary serial search is used for synchronization establishment.

In contrast, a method called matched filter is known for improving the synchronization establishment in a dedicated circuit. However, when the periodicity is so long, the circuit size becomes great and it is not practical in costs to mount such a circuit in a reproduction apparatus and a reception apparatus. In a case when a decoder is mounted on an audio reproduction apparatus for carrying out a copy management from an analog audio input, a method desired is one which is easily available at a low price and can be used in common for various apparatuses. Because of these problems, it has been considered difficult to realize a data multiplexing using the spectrum diffusion method.

SUMMARY OF THE INVENTION

It is therefore an object of the present invention to provide an audio data transmission apparatus and method, an audio data recording apparatus, and an audio data recording medium which are capable of multiplexing spectrum-diffused data on an analog audio signal with minimum deterioration of the audio quality.

The audio data transmission apparatus according to the present invention includes gap insert position detecting means and gap insert means, so that gaps is inserted by the gap inserting means at a position detected by the gap insert position detecting means. This gap is used as a control signal for multiplexing on the audio signal a spectrum-diffused data obtained according to an additional information.

Moreover, the audio data recording apparatus according to the present invention uses as a control signal the gap from the gap detection means, so that a demodulation means demodulates a spectrum-diffused data multiplexed on an audio signal, and according to the demodulated additional information, correction means corrects the spectrum-diffused data.

Moreover, the audio data recording medium according to the present invention contains an additional information as a spectrum-diffused data which is multiplexed on an audio signal using a gap as a control signal.

BRIEF DESCRIPTION OF THE DRAWINGS

FIG. 10 is a timing chart for explanation of a specific example of other operation in the embodiment of FIG. 6.

DETAILED DESCRIPTION OF THE PREFERRED EMBODIMENTS

Description will now be directed to an audio data transmission apparatus, an audio data recording apparatus, and an audio data recording medium according to embodiments of the present invention with reference to the attached drawings.

Figure 1:
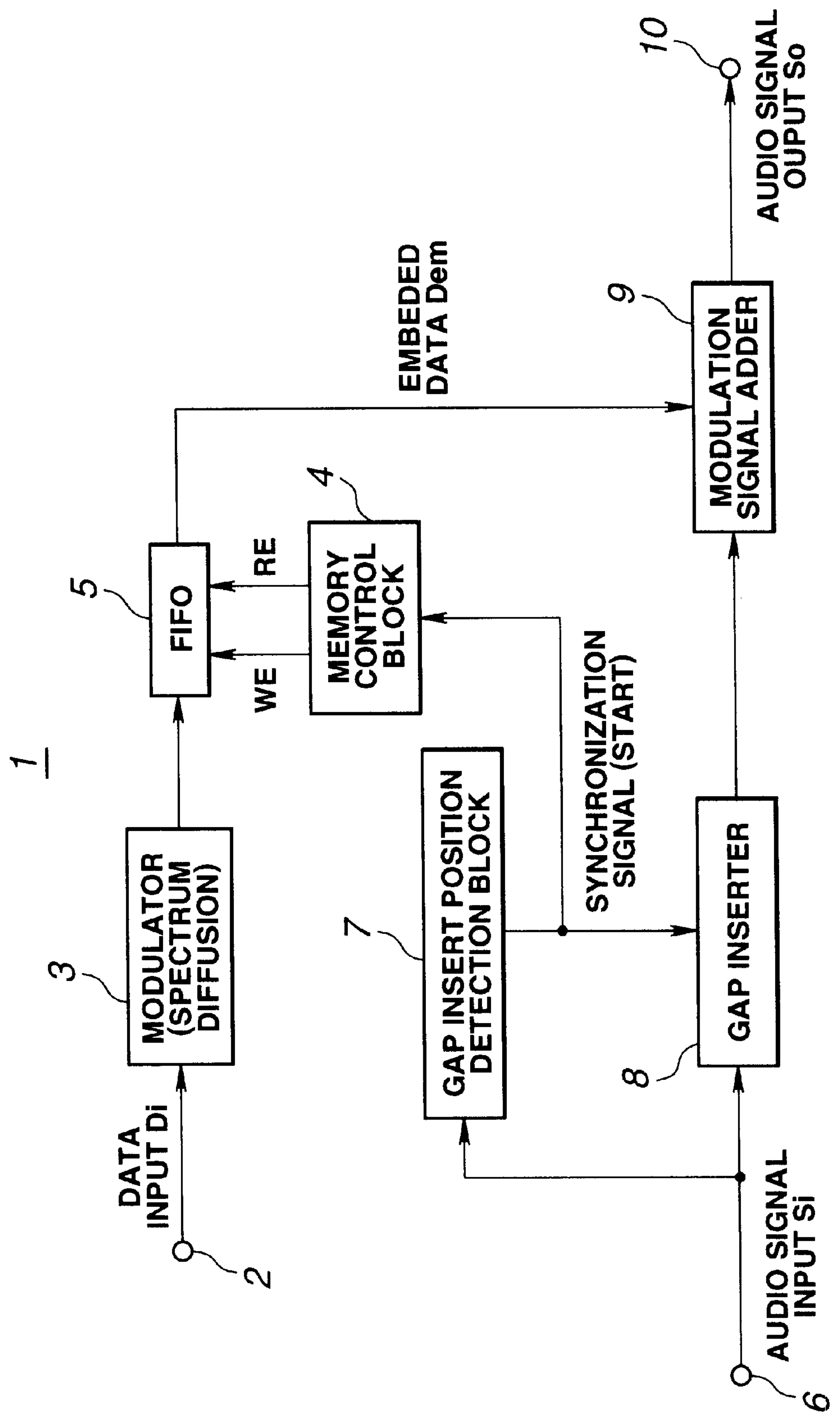
FIG. 1 is a block diagram showing an audio data transmission apparatus and method according to an embodiment of the present invention.

First, the audio data transmission apparatus and method will be discussed. This transmission apparatus is for multiplexing on an analog audio signal an additional information such as a copy prevention control signal or author right information which has been made into a spectrum-diffused data, and includes an encoder 1 shown in FIG. 1.

This encoder 1 includes: a modulator 3 for carrying out a spectrum diffusion on a data input Di which is the aforementioned additional information supplied through a data input terminal 2; a gap insert position detection block 7 for detecting a position allowing a gap insertion in an audio signal input Si supplied from a signal input terminal 6; a gap inserter 8 for inserting the gap at the insertion position detected by this gap insert position detection block 7; and a modulation signal adder 9 for multiplexing the spectrum-diffused data on the audio signal Si using as a control signal the gap which has been inserted by the gap inserter 8.

In this encoder 1, the input data Di is subjected to spectrum diffusion in the modulator 3 and is continuously written into a first-in first-out (FIFO) 5 by a write control signal (WE) supplied from a memory control block 4.

A gap is inserted from the gap inserter 8 at a gap insert start position detected by the gap insert position detection block 7 in the audio signal Si supplied from the input terminal 6. An embedded data Dem divided from the FIFO 5 by a read-out control signal (RE) from the memory control block 4 is added by the modulation signal adder 9 after the aforementioned gap on the audio signal for output as an audio signal output So from an output terminal 10.

Figures 2A, 2B, 2C, 2D:
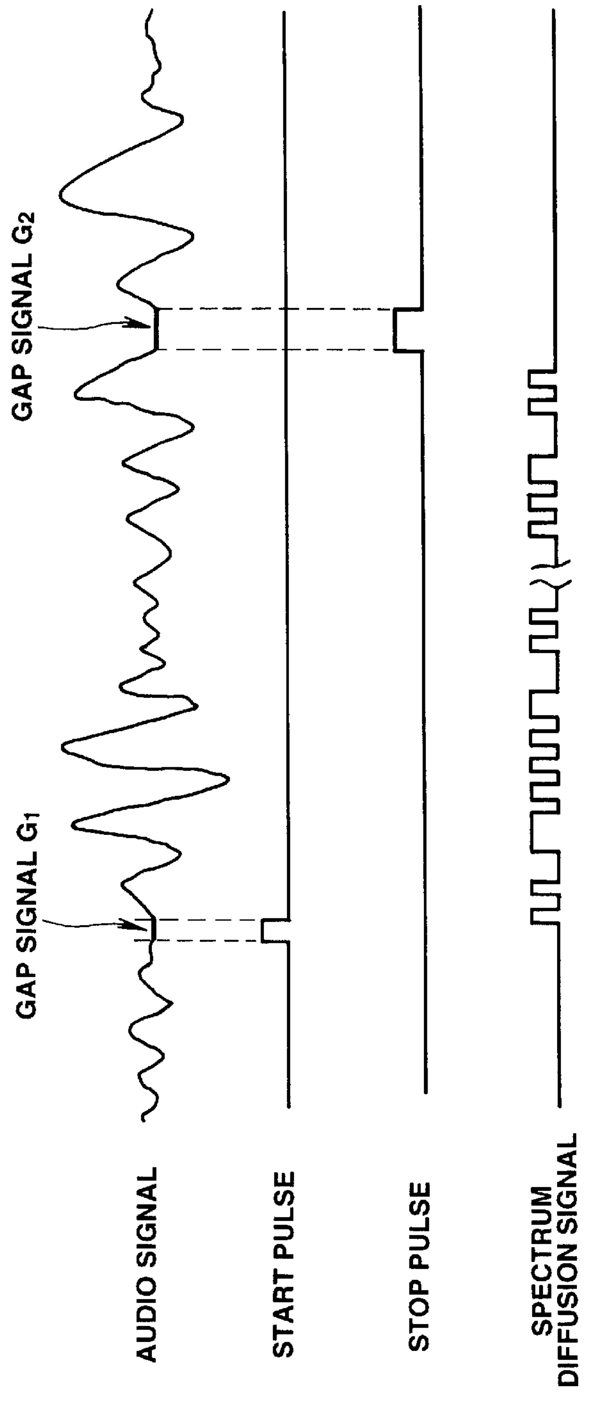
FIG. 2 is a timing chart for explanation of an example of controlling a spectrum diffusion signal by way of a gap width modulation using the aforementioned embodiment shown in FIG. 1.

A specific example of multiplexing a spectrum diffusion signal on the audio signal using this encoder 1 will be explained with reference to FIG. 2. The width of a gap signal G1 and the width of a gap signal G2 are varied so as to be respectively defined as a start pulse in FIG. 2B and a stop pulse in FIG. 2C, so that a spectrum diffusion signal is multiplexed between the gap signal G1 and the gap signal G2 on the audio signal shown in FIG. 2A.

Figures 3A, 3B, 3C:
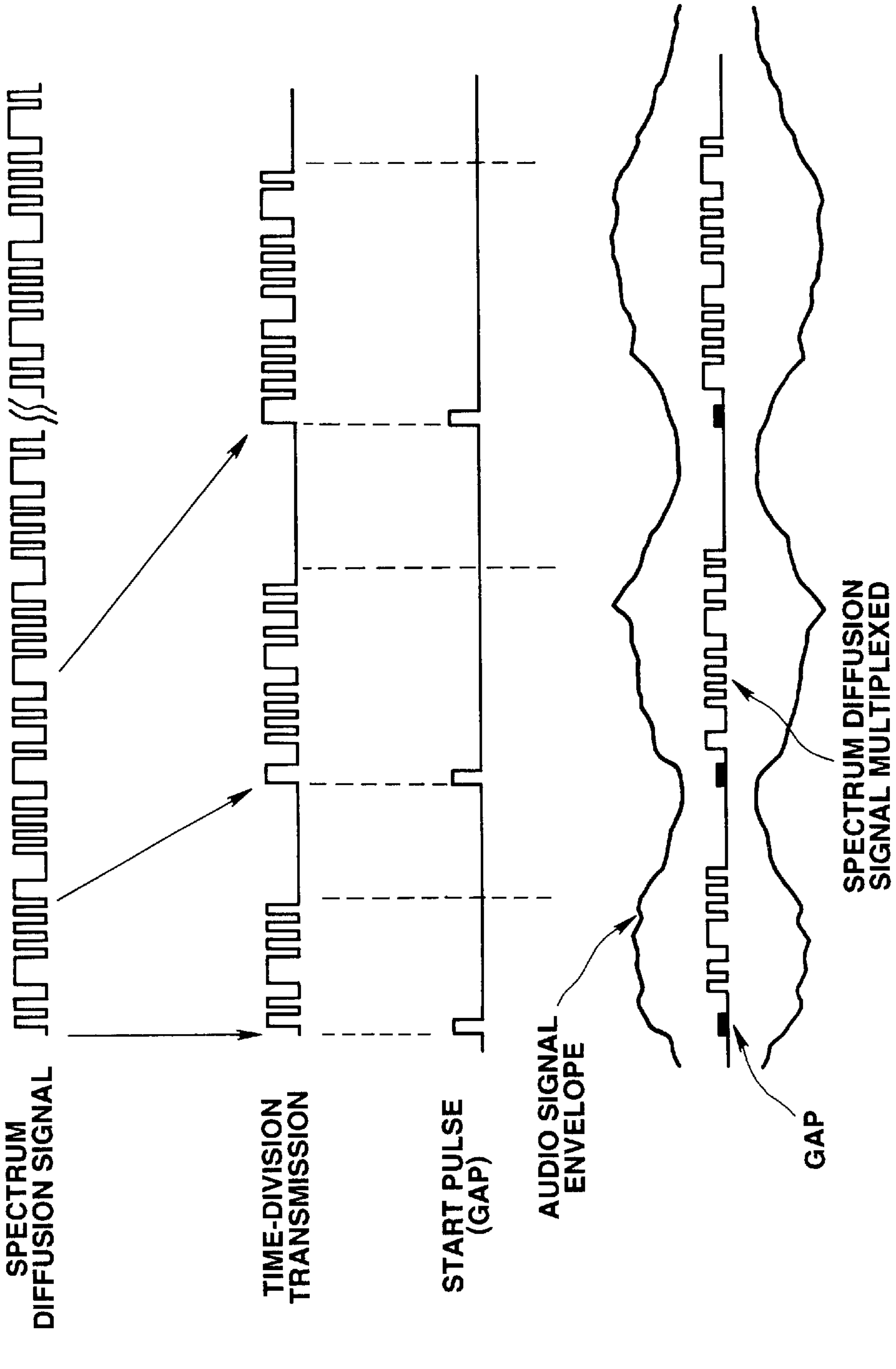
FIG. 3 is a timing chart for explanation of a time division transmission of a spectrum diffusion signal using the aforementioned embodiment of FIG. 1.

FIG. 3 explains another specific example of using this encoder 1 for dividing and multiplexing the spectrum diffusion signal on the audio signal. The spectrum diffusion signal shown in FIG. 3A is time-divided at a predetermined length as shown in FIG. 3B, so that each division is multiplexed on the audio signal after a start pulse of FIG. 3C. Thus, it is possible to multiplex the spectrum diffusion signal only at a high level position of the audio signal having a high masking effect, improving the S/N for the hearing sense.

It should be noted that it is also possible to multiplex the aforementioned spectrum diffusion signal at a position of a wider frequency spectrum, which also improves the S/N on the hearing sense.

Figure 4:
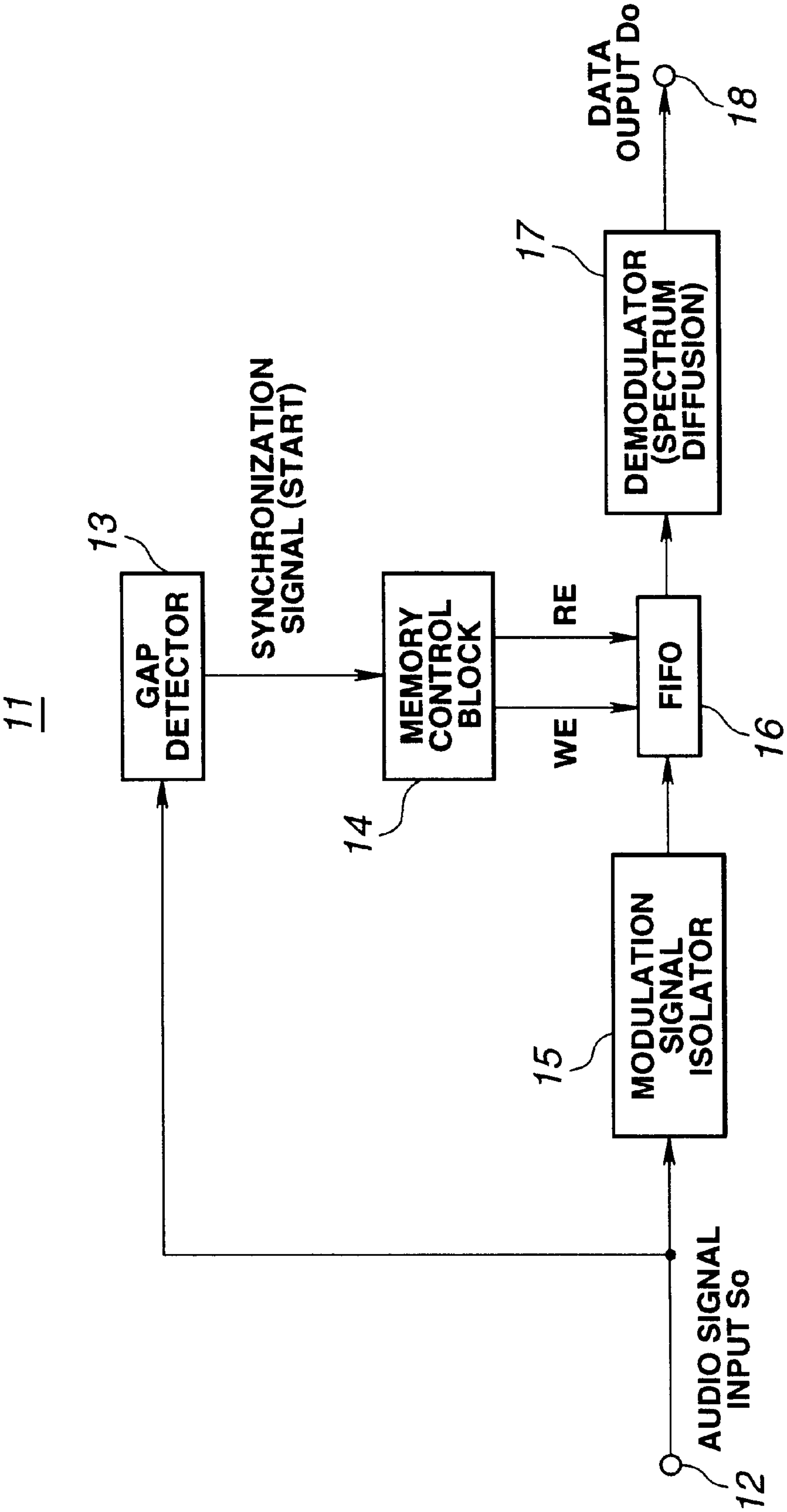
FIG. 4 is a block diagram showing an audio data reproduction apparatus according to an embodiment of the present invention.

The spectrum diffusion signal which has been time-divided and transmitted by the encoder 1 is demodulated according to the aforementioned gap by a decoder shown in FIG. 4.

Figures 5A, 5B:
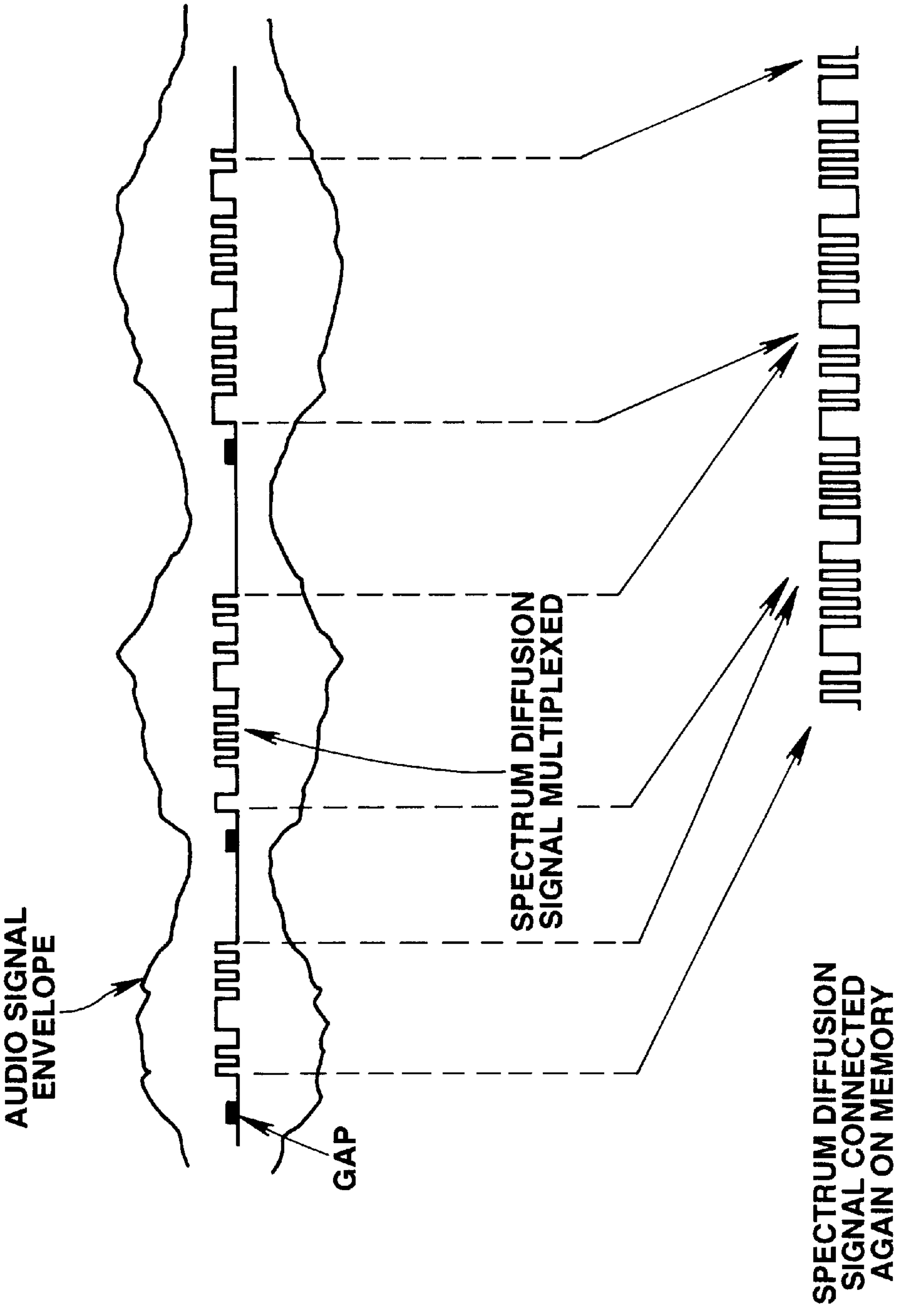
FIG. 5 is a timing chart for explanation of a demodulation procedure of a spectrum diffusion signal using the aforementioned embodiment of FIG. 4.

The decoder 11 is supplied with an audio signal input So (multiplexed with the spectrum diffusion signal) through a signal input terminal 12, from which the gap serving as the aforementioned start pulse is detected by a gap detector 13 and is supplied to a memory control block 14. The memory control block 14 supplies a write control signal (WE) to a FIFO 16 so that a modulation signal which has been isolated from the audio signal by a modulation signal isolator 15 is intermittently written into the FIFO 16. Moreover, the memory control block 14 supplies a read-out control signal to the FIFO 16 so that the aforementioned modulation signal is returned to a continuous spectrum diffusion signal as shown in FIG. 5B which is supplied to a demodulator 17. The demodulator 17 carries out a reverse spectrum diffusion onto the aforementioned continuous modulation signal, so as to be made back to the previous additional information data Do.

A memory other than a FIFO memory may be used.

Moreover, it is possible to use a modulation shift register in the spectrum diffusion (or reverse diffusion) apparatus, so as to replace the function of this memory. In such a case, the clock of the shift register is controlled by the gap. Thus, there is a possibility to reduce the size of the entire apparatus.

Description will now be directed to an encoder and a decoder including a modulator and a demodulator having the function of the aforementioned memory or the shift register.

Figure 6:
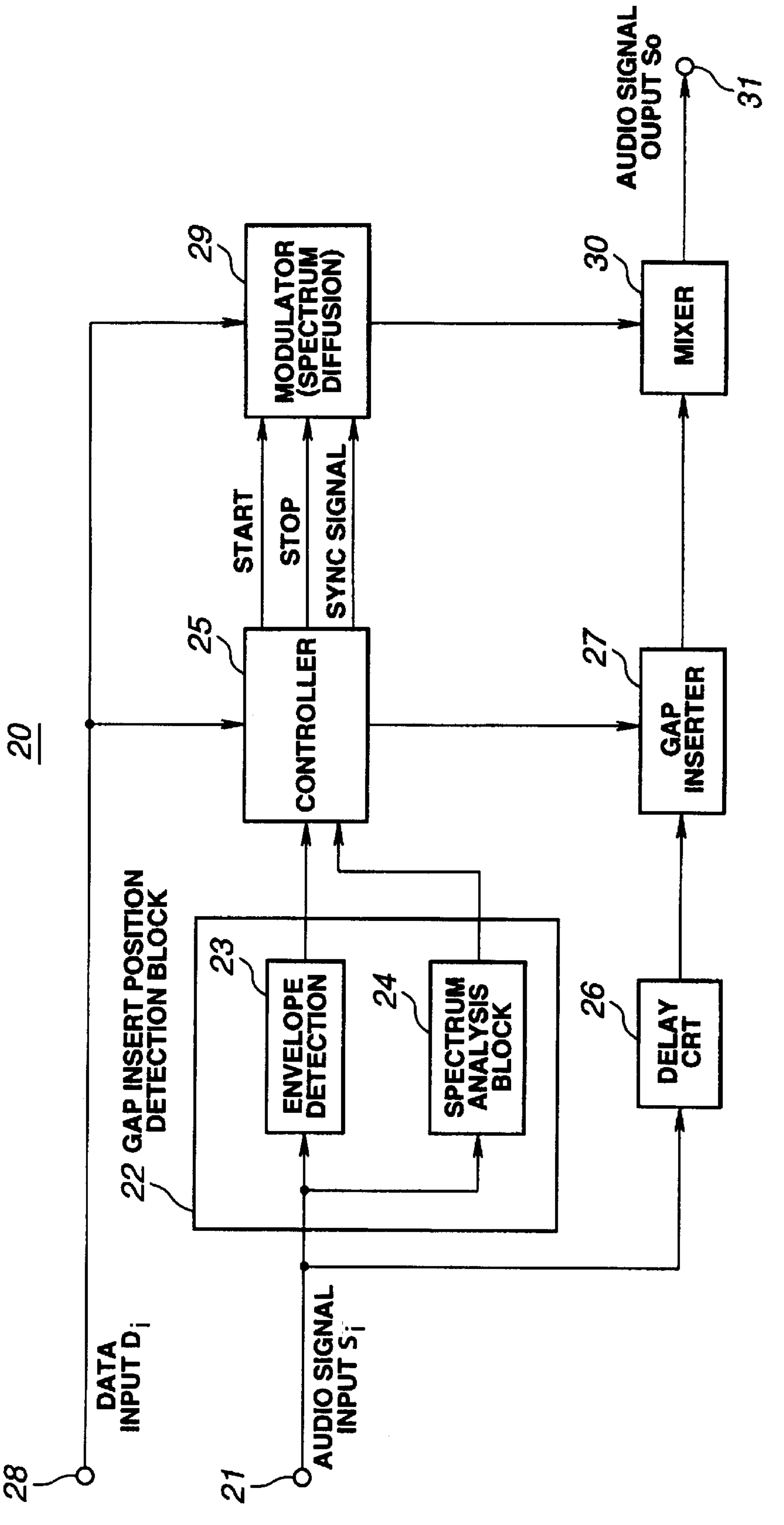
FIG. 6 is a block diagram showing an audio data transmission apparatus and method according to another embodiment of the present invention.

FIG. 6 shows an encoder 20 including a modulator 29 having a memory function or a shift register function.

An audio signal Si supplied through a signal input terminal 21 is firstly supplied to an envelope detection block 23 constituting a gap insert position detection block 22. This envelope detection block 23 detects an attack portion equal to or above a predetermined level in the audio signal input Si.

Moreover, the aforementioned audio signal input Si is also supplied to a spectrum analysis block 24 constituting the aforementioned gap insert position detection block 22, so as to detect a discontinuous portion of a spectrum immediately before the aforementioned attack portion.

Furthermore, the envelope detection block 24 detects a portion having a sufficiently small amplitude.

The aforementioned audio signal input Si is also supplied to a delay circuit 26. The input audio signal delayed by this delay circuit 26 is supplied to a gap inserter 27. This gap inserter 27 is controlled by a controller 25.

The controller 25 determines a position enabling insert of the aforementioned gap according to the detection outputs from the envelope detection block 23 and the spectrum analysis block 24 of the aforementioned gap insert detection block 22, and makes to insert the aforementioned gap at the position determined from the gap inserter 27. This gap is used as a control signal for a spectrum diffusion signal which will be recorded after this.

The data input Di to be embedded in the aforementioned audio signal is supplied through a data input terminal 28 to a modulator 29. The modulator 29 carries out a spectrum diffusion onto the aforementioned data input Di, which is temporarily recorded in the modulator 29 together with the synchronization, start, stop control timings. In synchronization with the gap insert, a predetermined width or a division is outputted from the modulator 29 and added by a mixer 30 to the audio signal, which is outputted as an audio signal output So from an output terminal 31.

Figure 7:
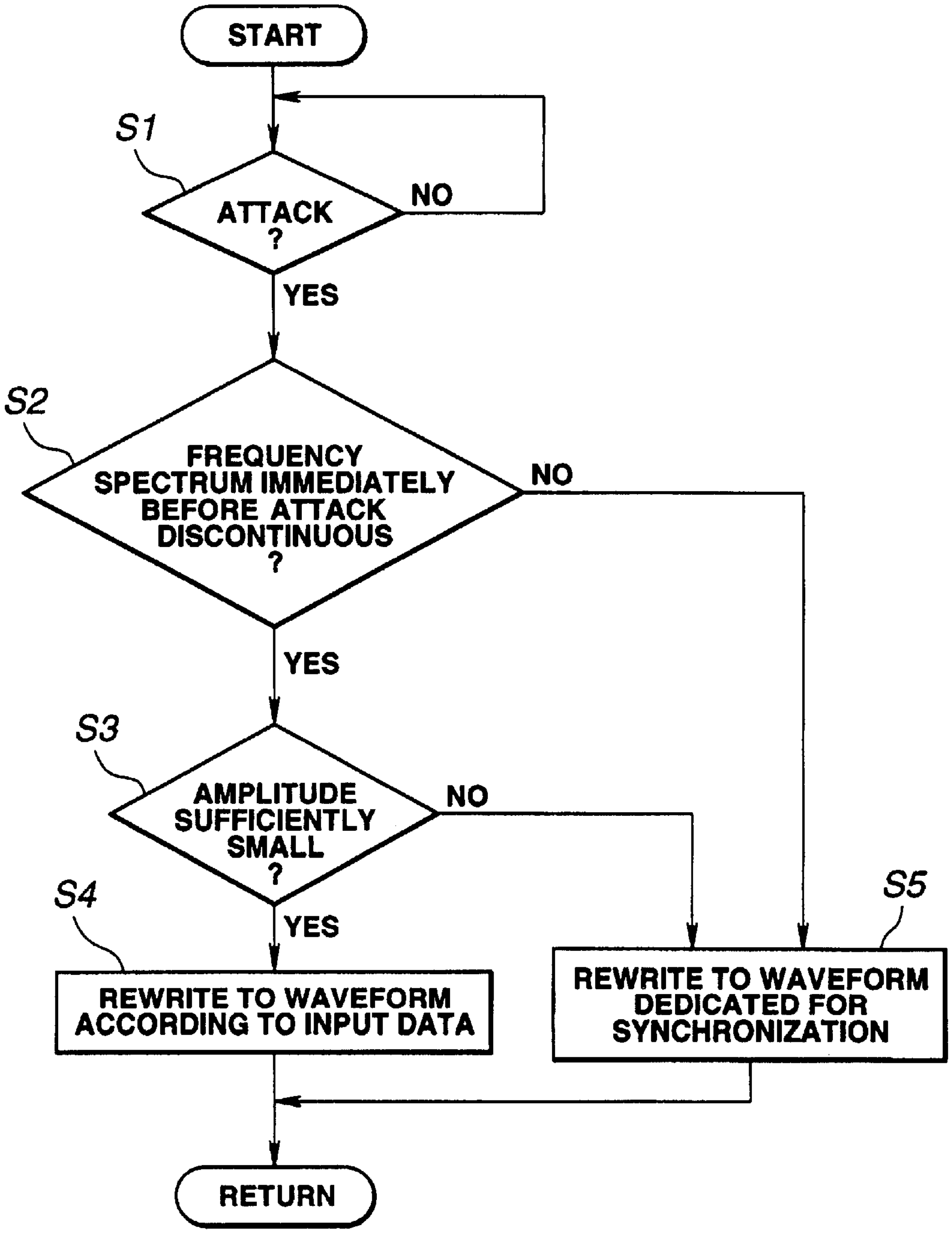
FIG. 7 is a flowchart for explanation of the operation of the embodiment of FIG. 6.

FIG. 7 is a flowchart showing the operation of this encoder. That is, in steps S1 to S3. a gap insert position is detected by the gap insert position detection block 22, and instep S4, the modulator 29 is used to write into a waveform of a spectrum diffused data according to the data input Di. If in step S2 a frequency spectrum immediately before the attack is not found to be discontinuous and if in step S3 the amplitude is not found sufficiently small, control is passed to step S5 where a waveform dedicated for synchronization is written.

When multiplexing a spectrum diffusion signal on an audio signal, conventionally, the diffusion signal is recorded continuously. Although the sound quality deterioration is reduced if the audio signal is sufficiently great with respect to the spectrum diffusion signal, the deterioration cannot be ignored for the area where the audio signal is very small.

In this encoder 20, it is possible to selectively multiplex a spectrum diffusion signal at arbitrary positions and to restore them as a continuous signal.

Consequently, in music for example, by recording the spectrum diffusion signal only at portions where the sound level is sufficiently great, it is possible to maintain a sufficient S/N on the hearing sense satisfying a high quality required.

Operation examples of this encoder 20 will be detailed below with reference to FIG. 8 to FIG. 10.

Figures 8A, 8B, 8C, 8D, 8E:
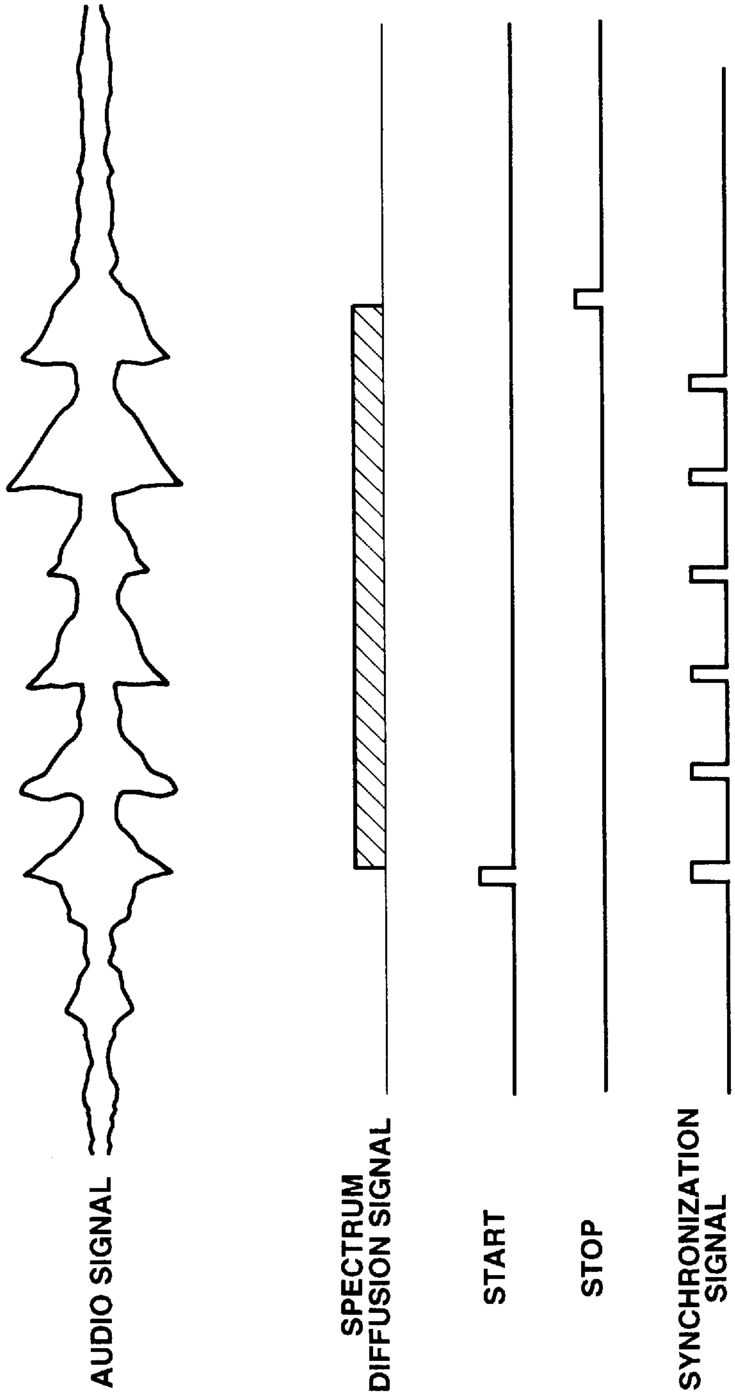
FIG. 8 is a timing chart for explanation of control of a spectrum diffusion signal by way of a gap signal of the embodiment shown in FIG. 6.

In FIG. 8, the gap signal has several values according to the width, level, and waveform, so as to realize functions of a start, stop, synchronization signal, and synchronization protection. At an arbitrary position of the audio signal shown in FIG. 8A, a start signal is inserted as shown in FIG. 8C, from which the spectrum diffusion recording is started as shown in FIG. 8B, and the recording is terminated by a stop signal at the timing shown in FIG. 8D. Moreover, if necessary, a synchronous signal or a signal of synchronization protection is inserted as shown in FIG. 8E. Thus, it is possible to insert a spectrum diffusion signal at a desired interval. In this specific example, it is possible to instantaneously determine the spectrum diffusion start position and end position and the synchronization position, which enables to realize a rapid detection.

Figures 9A, 9B, 9C, 9D:
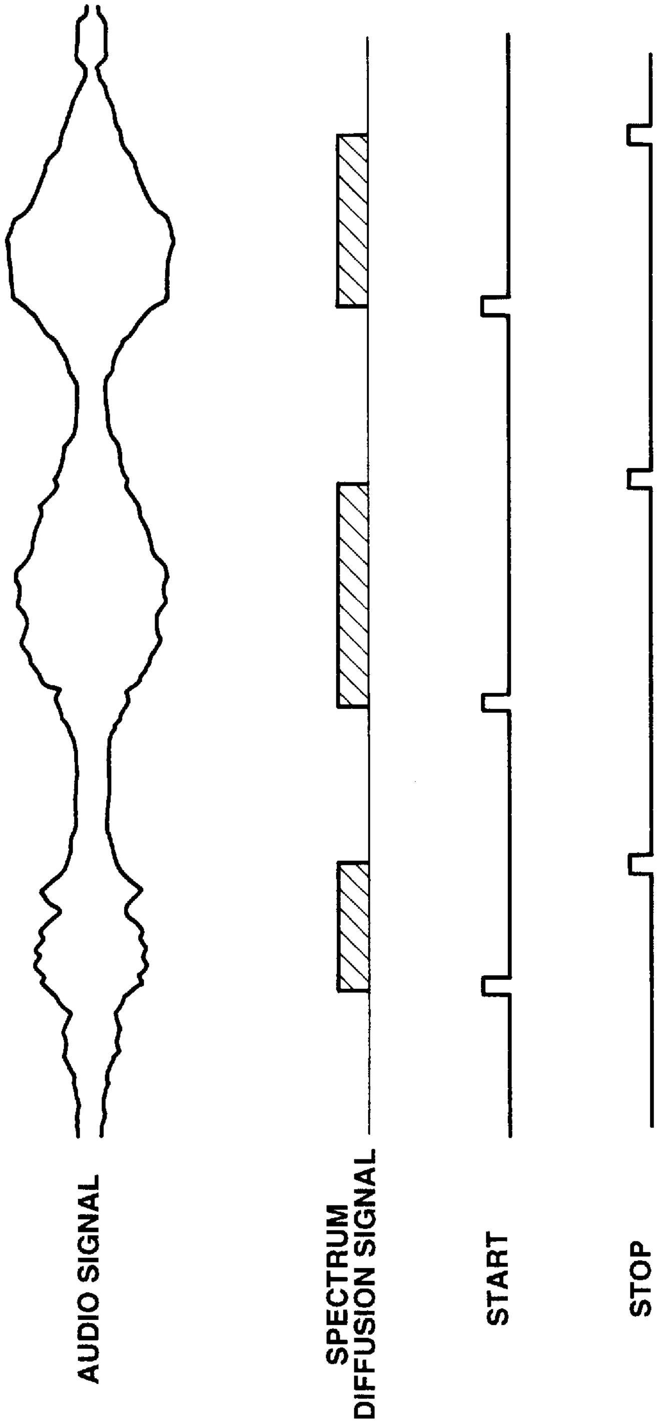
FIG. 9 is a timing chart for explanation of a specific example in which a spectrum diffusion signal is selectively inserted in a portion of an audio signal having a large amplitude and a wide band width where the masking effect can be expected in the embodiment of FIG. 6.

FIG. 9 shows a specific example of selectively inserting a spectrum diffusion signal at such a portion of a great amplitude and band width where the masking effect can be expected according to the audio signal amplitude. That is, a start pulse shown in FIG. 9C and a stop pulse shown in FIG. 9D are used to divide a spectrum diffusion signal as shown in FIG. 9B, so as to be multiplexed in the portions having a great amplitude in the audio signal shown in FIG. 9A. The S/N for the hearing sense is improved by not inserting the spectrum diffusion signal in a small signal portion and a narrow band of a music signal.

FIG. 10 shows a specific example of dividing the spectrum diffusion signal into blocks of a predetermined width and defining a start with a gap signal or a sync pattern for synchronization derived from the gap signal. That is, when multiplexing a spectrum diffusion signal on an audio signal as shown in FIG. 10A, if the stop signal position cannot be allocated at a preferable position due to the audio signal, only a start pulse is generated as shown in FIG. 10B and, as shown in FIG. 10C, the spectrum diffusion signal is recorded for a width of W from a position apart from the start pulse by an offset "a". This method is more preferable in most cases of music sources.

In this case, the block unit may be a chip interval (1 bit interval width of a modulation signal) multiplied by an integer, or a bit interval width (modulation signal interval width) multiplied by an integer. As the block width is determined in advance, it is possible to divide a continuous spectrum diffusion signal only by defining a start, so as to be recorded at arbitrary positions, which can also be reproduced.

Furthermore, it is possible to vary the recording level of the spectrum diffusion signal according to the recorded sound level. During a reproduction, this variation is detected by the envelope detector so as to realize the previous uniform level. This method can also be utilized to reduce the deterioration of the transmission characteristic of the additional information caused when the linearity of a previous sound signal is processed by a dynamic system such as a limitter, noise reduction, AGC and the like.

FIG. 10D shows a specific example of varying the recording level of the spectrum diffusion signal in accordance with the audio signal amplitude. This prevents error rate deterioration due to the fluctuation of the recording level of the recorded spectrum diffusion signal caused by an audio processing by a dynamic system such as a limitter and a noise reduction. By adjusting the recording level of the spectrum diffusion signal with a level in proportion to the sound level, it is possible afterward to normalize the recording level of the spectrum diffusion signal according to the audio signal level.

Next, the description will be directed to a case when the audio signal input Si supplied to the signal input terminal 21 in FIG. 6 has been compressed.

An audio compression technique such as the MPEG/ATRAC/AC-3 affects the spectrum diffusion signal multiplexed. Especially in an attack portion where an audio signal increases its data amount and in a portion having a very wide frequency band, a part of the spectrum diffusion signal having no correlation with the audio signal is deleted as a result of compression and cannot be correctly transmitted. To cope with this, in the present invention, the spectrum diffusion signal is recorded in areas other than those areas where the audio data amount is concentrated.

The first method is to record a spectrum diffusion signal with a predetermined time lapse after a start signal defined by a gap.

In general, compression on subband is carried out on a block unit of 512 or 1024 samples. Consequently, when embedding a gap, it is possible to select the start position of the spectrum diffusion signal, eliminating the audio signal attack portion, so as to reduce the affects from the transmission deterioration.

Moreover, the transmission deterioration due to compression also occurs when the frequency band is wide. Consequently, it is possible to reduce the deterioration by selecting a position of a gap signal so that the spectrum diffusion signal can start at other than the aforementioned wide frequency band portion.

The encoder 20 in FIG. 6 includes the gap insert position detection block 22 which detects an attack portion and a wide band region of the audio signal and a control signal defined by a gap is embedded by the gap inserter 27 evading such portions, so as to selectively multiplex the spectrum diffusion signal.

Figure 11:
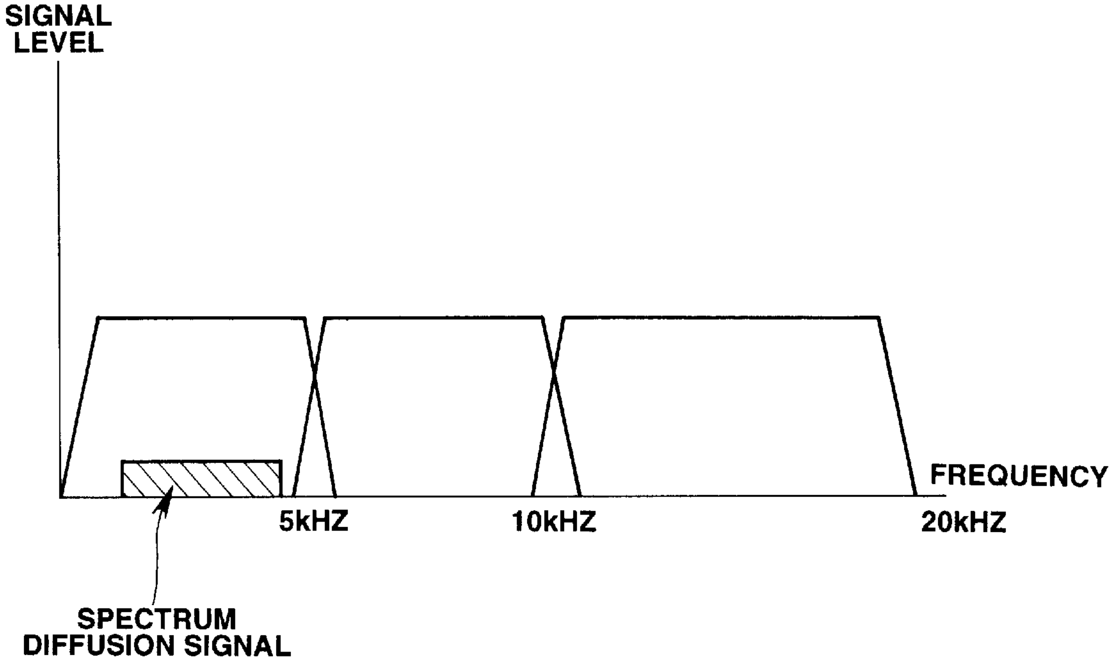
FIG. 11 shows a waveform for explanation of frequency band limit in a spectrum diffusion signal so as to cope with transmission deterioration due to the audio compression technique.

Moreover, in audio signal compression, generally, frequency components of the intermediate and lower zones have a higher priority. Especially, a zone up to 5 kHz is least affected by compression. Consequently, as shown in FIG. 11, it is possible to select the spectrum diffusion signal in the zone up to 5 kHz or limiting the zone before multiplexing, so as to reduce the transmission deterioration due to compression.

Moreover, the spectrum diffusion, because of its characteristic, cannot be detected if a medium having the spectrum diffusion is reproduced at a velocity changing more than a certain range. This problem cannot be solved unless the chip interval length of the spectrum diffusion signal can be determined during decoding. Tracing should be repeated while changing the chip interval or parallel detection should be carried out with several width values simultaneously.

To cope with this, the present invention divides the spectrum diffusion signal into shorter intervals so that the intervals can be synchronized with a gap, enabling to adjust for the velocity change easier than the original spectrum diffusion signal. For example, if the spectrum diffusion signal is divided into 1/10 intervals, the allowable deviation is improved by 10 times. Thus, reproduction velocity deviation allowed is significantly mitigated.

Moreover, according to the present invention, the synchronization method for the velocity system can also be improved. This is a method of recording a sync pattern for synchronization immediately after a gap, or on a gap, or at predetermined interval positions. The sync pattern may be a burst-type continuous wave, but considering the affects on the hearing sense, it is preferable to use a fixed pattern similar to a random noise.

The decoder detects the gap and reads the sync pattern, so as to determine a correct chip interval, which is followed by the spectrum-diffused data portion. The spectrum diffusion signal divided into blocks which are written into a memory, and when read out, they are again made into a continuous signal for supply to the decoder. The synchronization signal of the spectrum diffusion signal itself is written in the gap signal or the sync pattern, which enables to obtain synchronization instantaneously, starting demodulation (reverse diffusion) of the data.

Figures 12A, 12B:
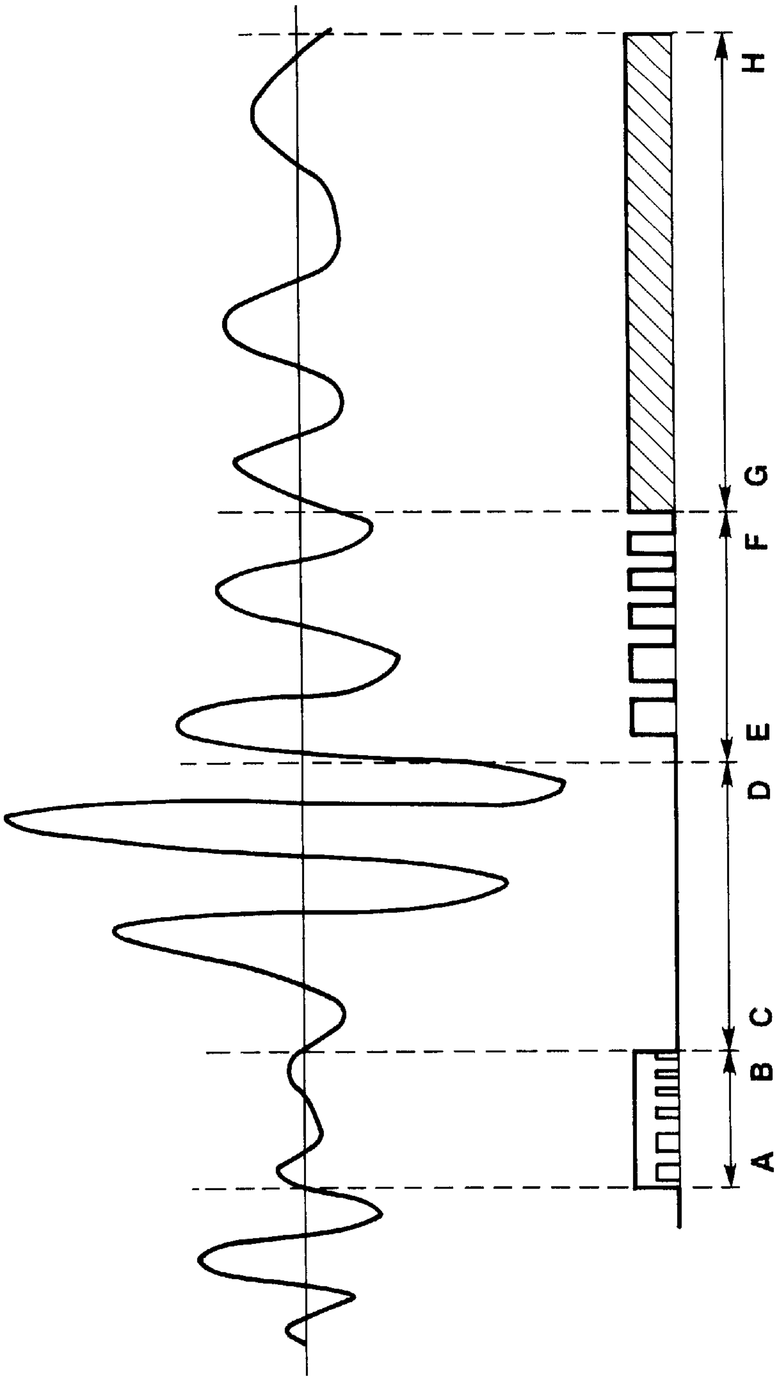
FIG. 12 shows a specific example of a data insertion according to the embodiment of FIG. 6.

FIG. 12 shows a specific example of a pattern indicating the spectrum diffusion chip interval width multiplexed in the gap interval AB. The interval GH represents a data portion of the spectrum diffusion.

Figures 13A, 13B:
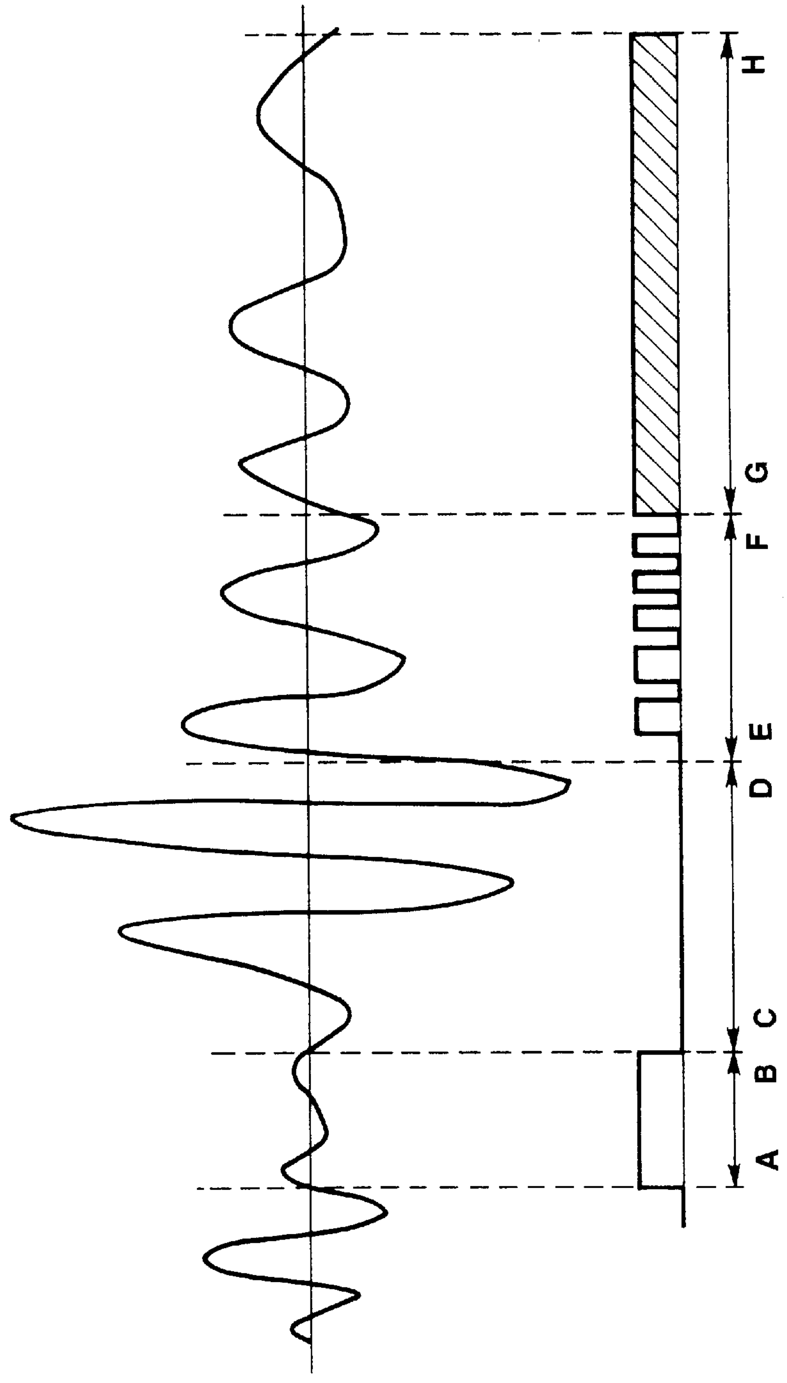
FIG. 13 shows another specific example of data insertion according to the embodiment of FIG. 6.

Moreover, FIG. 13 shows a specific example in which the gap interval AB is followed by an offset interval CD for coping with the compression; the interval EF is multiplexed with a pattern indicating information of spectrum diffusion velocity and phase; and the interval GH represents the spectrum diffusion data portion.

This example includes a time width CD (offset) as shown by "a" in FIG. 10, between the start pulse and the start of the spectrum diffusion. This is an example of error rate improvement by not recording the spectrum diffusion signal and the sync pattern for synchronization at the head of the attack portion where data loss is easily caused by an audio compression and the like. After detecting the gap (AB), and after the time lapse "a", the sync pattern for synchronization (EF) is read, and according to the phase and velocity information and synchronization obtained by this, the spectrum diffusion signal between G and H is read.

Moreover, it is possible to read the aforementioned spectrum diffusion data using the sync pattern between E and F, i.e., without using the gap between A and B.

Figure 14:
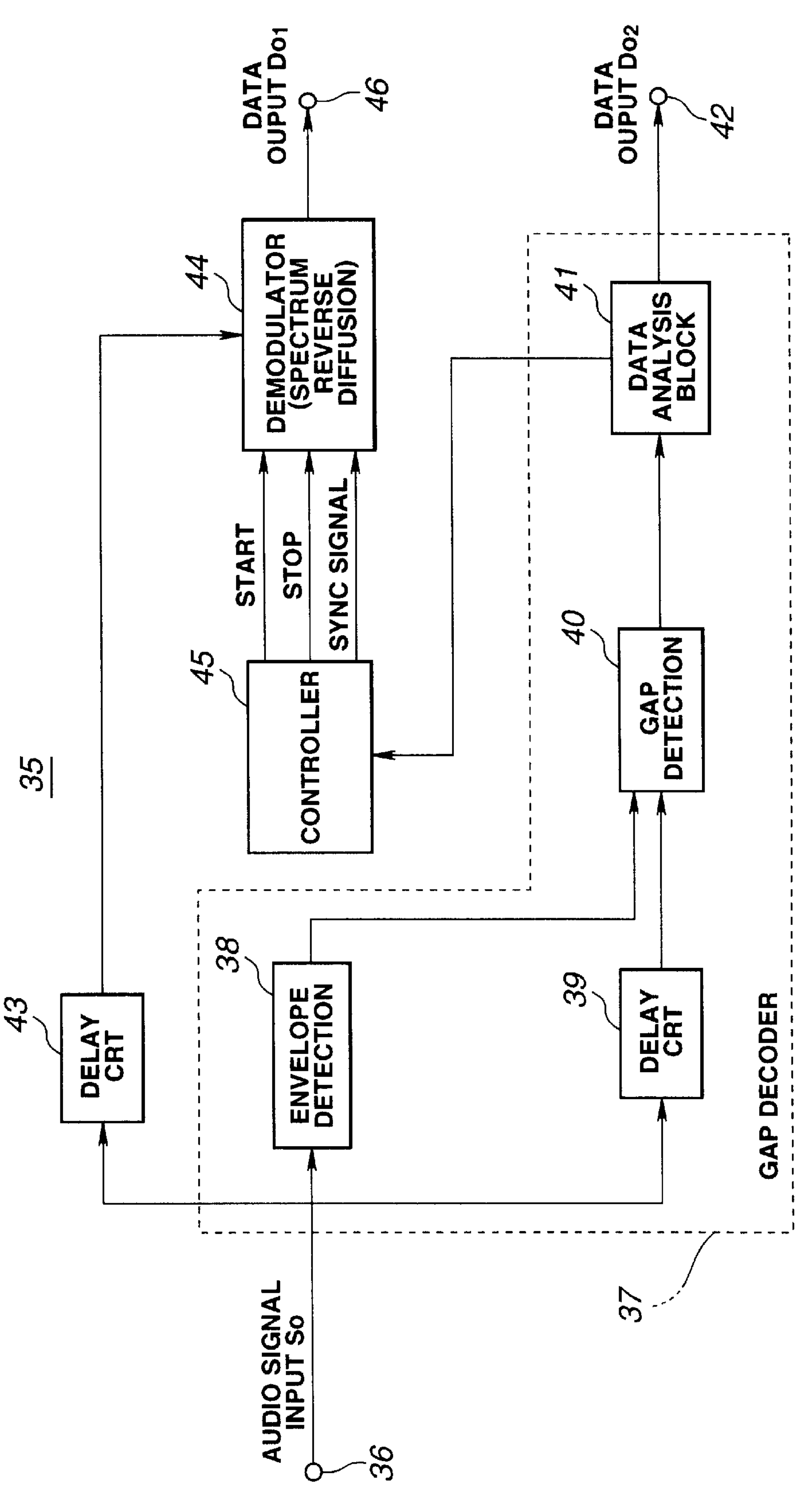
FIG. 14 is a block diagram showing an audio data reproduction apparatus according to still another embodiment of the present invention.

Next, FIG. 14 shows a decoder 35 including a demodulator 44 having a memory function and shift register function.

An audio signal input So fed through a signal input terminal 36 is supplied to an envelope detection block 38 constituting a gap decoder block 37. This envelop detection block 38 detects an attack portion in the aforementioned audio signal input So and transmits the detection output to a gap detector 40. The gap detector 40, according to the aforementioned detection output, detects a gap from the audio signal So fed through a delay circuit 39.

Furthermore, a data analysis block 41 detects a control gap. According to the position of this control gap, a controller 45 detects a sync pattern for synchronization and sets the phase and velocity of the spectrum diffusion signal.

According to this control signal, the spectrum diffusion signal divisions are connected in the demodulator 44 into a continuous signal and read out by the demodulator 44. The result of this reading is outputted as a data output Do1 from an output terminal 46.

Figure 15:
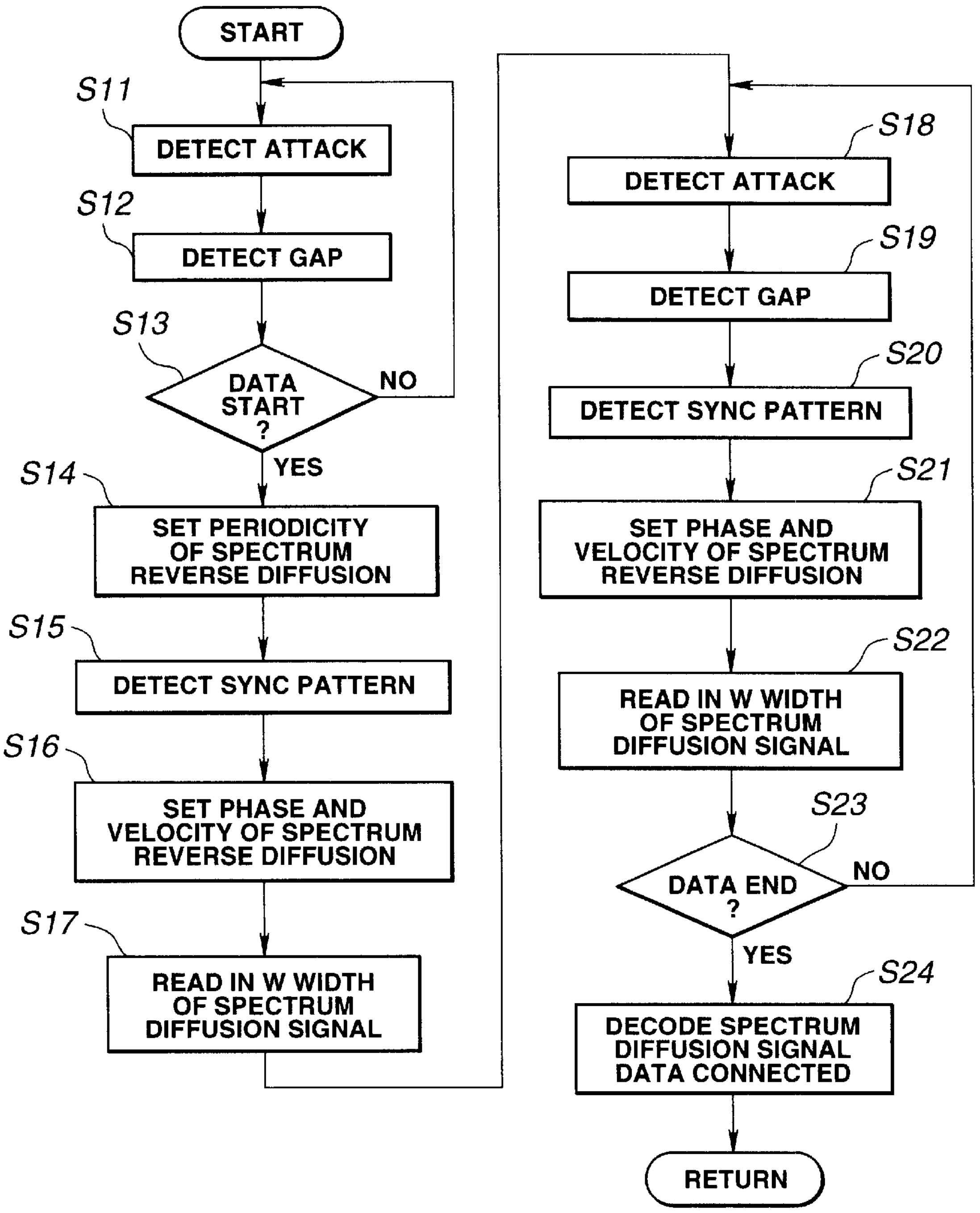
FIG. 15 is a timing chart explaining the operation of the embodiment of the aforementioned FIG. 14.

The operation of this decoder 35 will be detailed with reference to a flowchart of FIG. 15, assuming that the aforementioned spectrum diffusion signal is divided into several blocks which are multiplexed over an audio signal.

Firstly, when the envelope detection block 38 detects an attack in step S11, the gap detector 40 a detects a gap from the audio signal So delayed by the delay circuit 39.

In step S13, the controller 45 determines whether the control gap detected by the data analysis block 41 is a data start pulse. If the gap is a start pulse, control is passed to step S14 where a periodicity of the reverse spectrum diffusion is set in the demodulator 44, and in step S15 the sync pattern for synchronization is detected. In step S16, the phase and velocity of the reverse spectrum diffusion are set, and in step S17 the divided spectrum diffusion signal of a width W is read in. The spectrum diffusion signal which has been read in is stored in a memory or a shift register in the demodulator 44.

A similar operation is repeated in step S18 to S22, for reading out another spectrum diffusion signal division so as to be stored in the demodulator 44. When an end of the spectrum diffusion signal is detected by a stop pulse in step S23, control is passed to step S24 where the spectrum diffusion signal divisions stored in the demodulation block are connected to a single signal, which is subjected to spectrum reverse diffusion so as to be decoded.

Moreover, explanation will be given on a use of this decoder 35 for mixing the additional information by the spectrum diffusion signal with the additional information by the aforementioned gap, so as to be recorded.

By using the spectrum diffusion method in combination with the gap method, there arises a further effect with respect to an unauthorized revision. As for the revision, either of these methods can be destroyed in its data by using some method.

To cope with this, it is considered to use both of the methods for recording an important code such as an important data ISRC code for copy protection and prevention of unauthorized copying.

The combined use of the two methods can be realized as follows. Firstly, the gap method is used to record the ISRC code and the copy prevention code as well as the spectrum diffusion start, stop, synchronization signal and the like as the least necessary information. This alone can realize the least function. Next, these data are used to record a spectrum diffused data. For example, if a gap signal is revised by some method, the gap signal itself becomes ineffective. However, it is possible to use a complete matched filter, although the size is very large, to read out the spectrum diffused data. This is a very important function for tracing an unauthorized copy.

In the aforementioned case, the gap is mainly used for controlling the spectrum diffusion method. However, the gap itself can be used alone for overlapping an additional information relating to the copy protection. Consequently, on a gap signal, this additional information is also recorded in addition to a spectrum diffusion control signal. Thus, a recording data is made into a multiple strata for recording a data relating to copy protection by the two methods.

Moreover, in a high quality reproduction apparatus, there is a possibility that a master of unauthorized copying is prepared and accordingly, it is considered to mount the entire decoder of FIG. 14 for carrying out a stronger copy protection, whereas in a cheap low quality reproduction apparatus, a gap decoder block 37 alone is mounted for carrying out a copy protection of its level. That is, a common format can be used in strata, which enables to be applied to all the products.

Figure 16:
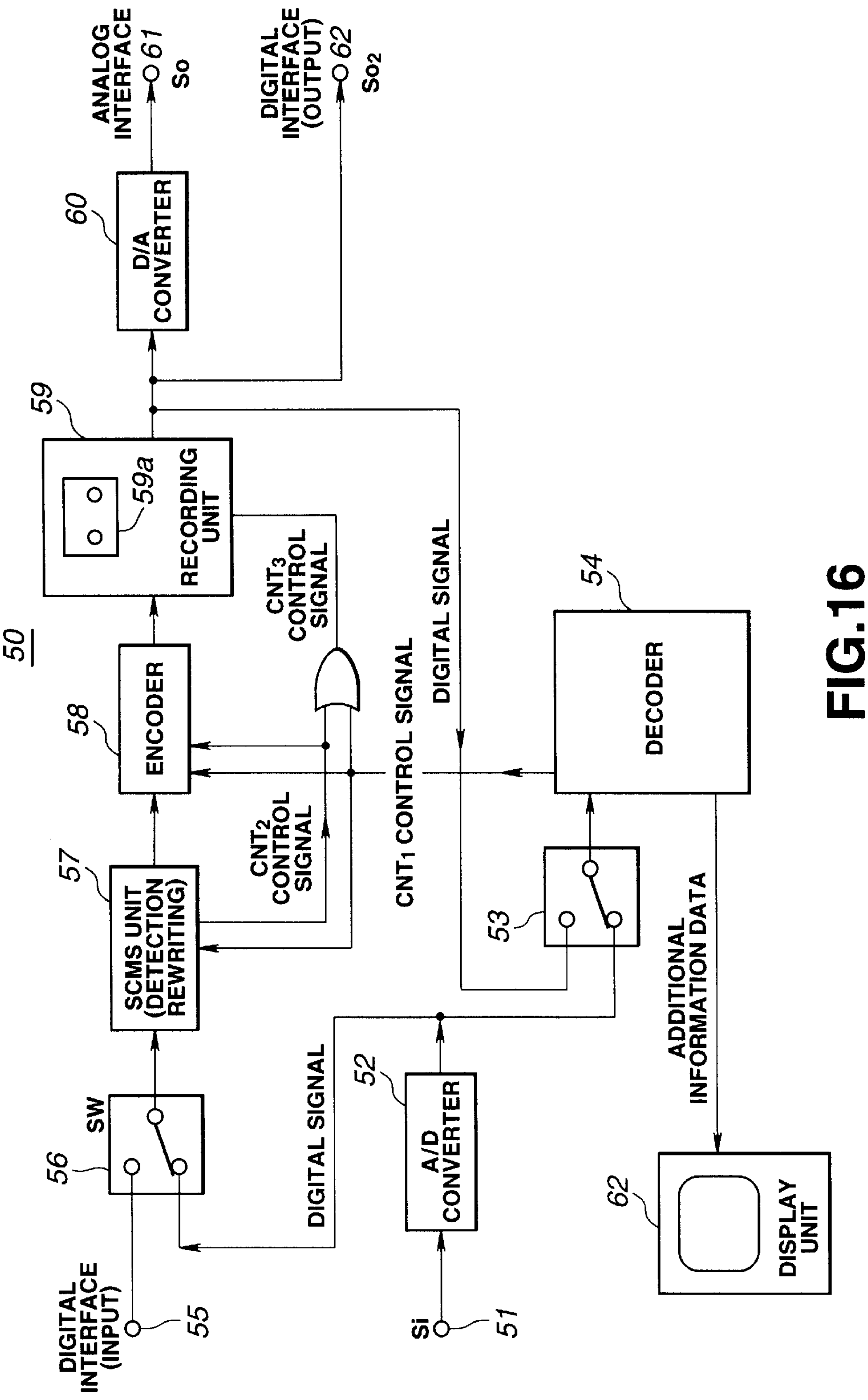
FIG. 16 is a block diagram showing an audio data recording apparatus according to yet another embodiment of the present invention.

Next, FIG. 16 shows an application example of the present invention using the aforementioned encoder and decoder.

This application example employs the conventional SCMS (serial copy management) in combination with the analog copy management according to the present invention.

An analog audio input Si inputted from a signal input terminal 51 is converted by an A/D converter 52 into a digital signal. The digital signal is supplied via a SW53 to a decoder 54 similar to the aforementioned decoder 11 and 35, for reading a copy control signal recorded by a gap and a spectrum diffusion signal. As a result of this reading, a control signal CNT1 is outputted for controlling a SCMS unit.

The audio signal which has been converted into a digital signal by the A/D converter 52 is supplied via SW56 to the SCMS unit 57. Here, if the analog audio signal indicates the first generation, the SCMS unit 57 rewrites the digital signal (actually, a sub code area) into a second generation.

The aforementioned digital audio signal is supplied to an encoder 58 similar to the aforementioned encoder 1 and 20, where it is controlled by the control signal CNT1 so that a gap and a spectrum diffusion are overlapped on the audio signal and the generation information is also rewritten. This result is recorded by a recording apparatus 59 on a recording medium (tape, disc, or the like) 59*a*. The audio signal reproduced by this recording apparatus 59 is converted by a D/A converter 60 into an analog audio signal which is outputted from an output terminal 61 as an audio output So.

In a case when recording using a conventional digital interface, the signal is supplied via SW56 to the SCMS unit 57 where the generation is rewritten, and supplied to the encoder 58 where the same information is rewritten on the audio signal.

Moreover, for example, the control signal CNT2 when the conventional SCMS inhibits copying is combined with the control signal CNT1 when the copying is inhibited in analog, and their disjunction as CNT3 will stop recording operation of the recording apparatus 59.

Here, the rewriting of the generation information can be carried out in the same way as the conventional SCMS. Consequently, this application example means extension of the copy management which has been carried out in the digital interface over the analog interface.

Moreover, when this signal is reproduced by the recording apparatus (capable of reproduction) 59, this signal is supplied via SW53 so that the additional information data recorded on the audio data will appear on a display unit 62.

Moreover, in the present invention, besides the recording of an additional information using mixture of the aforementioned spectrum diffusion signal and the gap, there are some more ways to cope with unauthorized copying through data revision and destruction.

The gap may be destroyed by a special apparatus. To cope with this, the gap can be repaired even if destroyed. A correlation of a high reproductivity is defined between a feature of an audio signal recorded and the gap position. When an apparatus having this function is used to reproduce an audio signal in which the gap has been destroyed, the previous gap insert position can be restored. If the similar processing prior to the destruction is carried out according to this, it is possible to demodulate the spectrum diffusion signal.

Moreover, by allocating the aforementioned sync pattern for synchronization not on a gap but at a position apart from the gap, even if the gap is destroyed, it is possible to demodulate the spectrum diffusion signal by using an apparatus having a matched filter for the sync pattern for synchronization.

On the contrary, if the sync pattern for synchronization is destroyed, a correlation of a high reproductivity is defined between the feature of the recorded audio signal and the sync pattern for synchronization, and the sync pattern for synchronization is restored to demodulate the spectrum diffusion signal. However, in this case, the time accuracy is lowered, it is necessary to try several times for the phase.

Moreover, as shown in FIG. 16, according to the present invention, a function other than the copy protection is realized. This function can be used, for example, as follows. When the contents are processed with intention to exclude the copy protection, simultaneously with this or prior to this, the embedded data such as the music information, the text, and MIDI is destroyed. Thus, it is possible to make the user unwilling to carry out an unauthorized act because of the data destruction.

Moreover, according to the present invention, the function of the additional information provides a copy management function such as SCMS extended to analog, which can also be extended to a sub code such as CD/DAT/MD (mini disc) for a sufficient data rate can be obtained. With this, if a copy protect recorded in analog is intentionally removed, the function available on the digital sub code data such as a music selection and search is also automatically disabled. Especially if the digital sub code information is also modified and rewritten, (if the analog data has a higher priority), the same problem is caused by the medium recorded by an apparatus using this protect even when mounted on a conventional apparatus. This makes to lose the convenience of a digital apparatus and effectively prevents the user from removing the analog embedded information through an unauthorized revision.

Moreover, the present invention utilizes important factors of the music information such as attack, tempo, and level.

By using these factors, for example, it is possible to record on an analog embed a data relating to a control of important portions during recording and reproduction such servo and sound volume, so as to be used by the apparatus. If the copy protect recorded in analog is intentionally removed, the information is also lost, which disables recording, reproduction, or other operation. Thus, analog embedded information can be protected.

Recently, techniques have been developed for recording a 20-bit data such as HDCD on a 16-bit CD. Among these, there are those which directly embed the audio data on a digital data, and the conditions to correctly reproduce these are written in the analog embedded information so that the apparatus is affected by that. Thus, from unauthorized processed music contents, it is impossible to obtain a correct sound volume or quality.

Moreover, it is possible to control music emphasis. That is, if the analog embedded information is removed, the data indicating the emphasis information becomes abnormal. This causes extreme deterioration of the frequency characteristic of an audio signal. If simultaneously with this, the emphasis information on the digital sub code is rewritten in the recording block, the medium recorded by this apparatus cannot be reproduced correctly even by an apparatus not having this new copy protect method.

It should be noted that the present invention can also be applied to a ground wave between a broadcasting station and a reception apparatus as well as an audio signal transmission by satellite broadcasting, audio signal transmission by Internet, and an audio signal transmission between computers.

As has been described above, the present invention enables a short-time synchronization and detection required for a copy protect and the like. Moreover, by selective writing using a hearing sense masking, it is possible to overlap on an audio signal a data minimizing deterioration of the audio signal. The hardware for detection is a simple one which can be realized at low costs. Moreover, it is possible to additionally write a copy generation information, user code, and the like. Moreover, it is possible to realize more data channels than in the conventional one. Moreover, it is possible to correctly read a data even if the audio signal reproduction speed is varied. Moreover, it is possible to transfer a data with an audio compression such as MPEG/ATRAC/AC-3. Moreover, the present invention enables a hybrid method using the gap method in combination, simultaneously realizing a simple method and a high technique method, and can be applied to a wide range of product groups. Moreover, it is possible to extend to analog interface the copy management and the data transmission in the conventional digital interface such as SCMS. Moreover, when an additional information embedded is processed for unauthorized copying, the recording apparatus and the reproduction apparatus are disabled to operate correctly, thus inhibiting unauthorized copying.

What is claimed is:

1. An audio data transmission apparatus for combining additional information with an audio signal, comprising:

gap insert position detection means for detecting a position in said audio signal where a gap can be inserted, said position corresponding to a temporal location where said audio signal has a large magnitude;

spectrum diffusion means for spectrum-diffusing said additional information prior to combination with said audio signal to generate spectrum diffused additional information;

dividing means for dividing said spectrum diffused additional information into a plurality of sections;

gap insert means for inserting said gap at the insert position detected by said gap insert position detection means; and combine means for using said gap as a control signal for combining said plurality of sections and said audio signal.

2. An audio data transmission apparatus as claimed in claim 1, wherein said gap inserted by said gap insert means is used as a control signal for controlling a start, stop, and synchronization of said spectrum diffused additional information.

3. An audio data transmission apparatus as claimed in claim 2, wherein said spectrum-diffused additional information is multiplexed by said gap at an arbitrary position on said audio signal.

4. An audio data transmission apparatus as claimed in claim 3, wherein said arbitrary position corresponds to a temporal location where said audio signal has a wide frequency spectrum.

5. An audio data transmission apparatus as claimed in claim 2, wherein said gap is periodically inserted according to said audio signal so that said sections are recorded according to a time division.

6. An audio data transmission apparatus as claimed in claim 1, wherein said gap is inserted in said audio signal according to said additional information, so that said spectrum-diffused additional information and said additional information controlled by said gap are recorded in strata on said audio signal.

7. An audio data transmission method for combining additional information with an audio signal in which a position within said audio signal where a gap can be inserted is detected and the gap inserted at the position is used as a control signal for combining a spectrum-diffused version of said additional information with the audio signal, said spectrum-diffused version being combined with said audio signal so as to be transmitted, wherein said position within said audio signal corresponds to a temporal location where said audio signal has a large magnitude, and wherein said spectrum diffused version of said additional information is divided into a plurality of sections for combination with said audio signal.

8. An audio data recording apparatus for recovering additional information from a combination of said additional information and an audio signal, said additional information having been spectrum diffused and divided into a plurality of sections for combination with said audio signal, said apparatus comprising:

gap detection means for detecting a gap in said audio signal, said gap occurring at a temporal position within said audio signal where said audio signal has a large magnitude;

demodulating means for using said gap as a control signal for decoding the combination of said sections and said audio signal to determine said sections; and correction means for correcting said sections according to information demodulated by said demodulating means.

9. An audio data recording apparatus as claimed in claim 8, wherein said demodulation means demodulates said sections according to said control signal even if said audio signal has a reproduction velocity modified.

10. An audio data transmission and recording apparatus for combining additional information with an audio signal and for recovering said additional information from the combination of said additional information and said audio signal, said apparatus comprising an audio data transmission apparatus and an audio data recording apparatus, said audio data transmission apparatus including:

gap insert position detection means for detecting a position in said audio signal where a gap can be inserted, said position corresponding to a temporal location where said audio signal has a large magnitude;

spectrum diffusion means for spectrum diffusing said additional information prior to combination with said audio signal to generate spectrum diffused additional information;

dividing means for dividing said spectrum diffused additional information into a plurality of sections;

gap insert means for inserting said gap at the insert position detected by said gap insert position detection means; and combine means for using said gap as a control signal for combining said plurality of sections and said audio signal; and said audio data recording apparatus including:

gap detection means for detecting said gap;

demodulation means for using said gap as a control signal so as to demodulate the combination of said sections and said audio signal to determine said sections; and correction means for correcting said sections according to information demodulated by said demodulation means.

11. An apparatus for combining additional information with a signal, comprising:

gap insert position detection means for detecting a position in said signal where a gap can be inserted, said position corresponding to a temporal location where said signal has a large magnitude;

gap insert means for inserting said gap at the insert position detected by said gap insert position detection means;

dividing means for dividing said additional information into a plurality of sections; and combine means for using said gap as a control signal for combining said plurality of sections and said signal.

12. The apparatus as claimed in claim 11, wherein said gap inserted by said gap insert means is used as a control signal for controlling a start, stop, and synchronization of said additional information.

13. The apparatus as claimed in claim 12, wherein said additional information is multiplexed by said gap at an arbitrary position on said signal.

14. The apparatus as claimed in claim 13, wherein said arbitrary position is a position where said signal has a wide frequency spectrum.

15. The apparatus as claimed in claim 11, wherein said gap is periodically inserted according to said signal so that said additional information sections are recorded according to a time division.

16. The apparatus as claimed in claim 11, wherein said gap is inserted on said signal according to said additional information.

17. A method for combining additional information with a signal, in which a position within said signal where a gap can be inserted is detected and the gap inserted at the position is used as a control signal for combining said additional information with the signal, so that said additional information is combined with said signal for transmission, wherein said position within said signal corresponds to a temporal location where said signal has a large magnitude, and wherein said additional information is divided into a plurality of sections for combination with said signal.

18. An apparatus for recovering additional information that has been divided into a plurality of sections and combined with a signal, comprising:

gap detection means for detecting a gap in said signal, said gap occurring at a temporal position within said signal where said signal has a large magnitude;

demodulating means for using said gap as a control signal for decoding the combination of said sections and said signal to determine said sections; and correction means for correcting said sections according to information demodulated by said demodulating means.

19. The apparatus as claimed in claim 18, wherein said demodulation means demodulates said additional information according to said control signal even if said signal has a reproduction velocity modified.

20. An apparatus for combining additional information with a signal and for recovering said additional information from the combination of said additional information and said signal, including a combining means and a gap detection means, said apparatus comprising:

gap insert position detection means for detecting a position in said signal where a gap can be inserted, said position corresponding to a temporal location where said signal has a large magnitude;

gap insert means for inserting said gap at the insert position detected by said gap insert position detection means;

dividing means for dividing said additional information into a plurality of sections;

combine means using said gap as a control signal for combing said plurality of sections and said signal;

gap detection means for detecting said gap;

demodulation means for using said gap as a control signal for decoding the combination of said sections and said signal to determine said sections; and correction means for correcting said sections according to information demodulated by said demodulation means.

21. An apparatus for combining additional information with a signal, comprising:

gap insert position detection means for detecting a position in said signal where a gap can be inserted, said position corresponding to a temporal location where said signal has a large magnitude;

spectrum diffusion means for spectrum-diffusing said additional information prior to combination with said signal to generate spectrum diffused additional information;

dividing means for dividing said spectrum diffused additional information into a plurality of sections;

gap insert means for inserting said gap at the insert position detected by said gap insert position detection means; and combine means for using said gap as a control signal for combining said plurality of sections and said signal.

22. The apparatus as claimed in claim 21, wherein said gap inserted by said gap insert means is used as a control signal for controlling a start, stop, and synchronization of said spectrum diffused additional information.

23. The apparatus as claimed in claim 22, wherein said spectrum diffused additional information is multiplexed by said gap at an arbitrary position on said signal.

24. The apparatus as claimed in claim 23, wherein said arbitrary position is a position where said signal has a wide frequency spectrum.

25. The apparatus as claimed in claim 21, wherein said gap is periodically inserted according to said signal so that said sections are recorded according to a time division.

26. The apparatus as claimed in claim 21, wherein said gap is inserted on said signal according to said additional information, so that said spectrum diffused additional information and said additional information controlled by said gap are recorded in strata on said signal.

27. A method for combining additional information with a signal in which a position within said signal where a gap can be inserted is detected and the gap inserted at the position is used as a control signal for combining a spectrum-diffused version of said additional information with the signal, so that said spectrum-diffused version combined with said signal may be transmitted, wherein said position within said signal corresponds to a temporal location where said signal has a large magnitude, and wherein said spectrum diffused version of said additional information is divided into a plurality of sections for combination with said signal.

28. An apparatus for recovering additional information from a combination of said additional information and a signal, said additional information having been spectrum diffused and divided into sections for combination with said signal, said apparatus comprising:

gap detection means for detecting a gap in said signal, said gap corresponding to a temporal location within said signal where said signal has a large magnitude;

demodulating means for using said gap as a control signal for decoding the combination of said sections and said signal to determine said sections; and correction means for correcting said sections according to information demodulated by said demodulating means.

29. The apparatus as claimed in claim 28, wherein said demodulating means demodulates said sections according to said control signal even if said signal has a reproduction velocity modified.

30. An apparatus for combining additional information with a signal and for recovering said additional information from the combination of said additional information and said signal, including a combining means and a gap detection means, said apparatus comprising:

gap insert position detection means for detecting a position in said signal where a gap can be inserted, said position corresponding to a temporal location where said signal has a large magnitude;

spectrum diffusion means for performing a spectrum diffusion on said additional information to generate spectrum diffused additional information;

dividing means for dividing said spectrum diffused additional information into a plurality of sections;

gap insert means for inserting said gap at the insert position detected by said gap insert position detection means;

combine means using said gap as a control signal for combining said plurality of sections and said signal;

gap detection means for detecting said gap;

demodulation means for using said gap as a control signal for decoding the combination of said sections and said signal to determine said sections; and correction means for correcting said sections according to information demodulated by said demodulation means.

31. An apparatus for combining additional information with an audio signal, comprising:

gap insert position detection means for detecting a position in said audio signal where a gap can be inserted, said position corresponding to a temporal location within said audio signal where said audio signal has a large magnitude;

gap insert means for inserting said gap at the insert position detected by said gap insert position detection means;

dividing means for dividing said additional information into a plurality of sections; and combine means for using said gap as a control signal for combining said plurality of sections and said audio signal.

32. The apparatus as claimed in claim 31, wherein said gap inserted by said gap insert means is used as a control signal for controlling a start, stop, and synchronization of said additional information.

33. The apparatus as claimed in claim 32, wherein said additional information is multiplexed by said gap at an arbitrary position on said audio signal.

34. The apparatus as claimed in claim 33, wherein said arbitrary position is a position where said audio signal has a wide frequency spectrum.

35. The apparatus as claimed in claim 31, wherein said gap is periodically inserted according to said audio signal so that said additional information sections are recorded according to a time division.

36. The apparatus as claimed in claim 31, wherein said gap is inserted on said audio signal according to said additional information.

37. A method for combining additional information with an audio signal in which a position within said audio signal where a gap can be inserted is detected and the gap inserted at the position is used as a control signal for combining said additional information with the audio signal, so that said additional information is combined with said audio signal for transmission, wherein said position within said audio signal corresponds to a temporal location where said audio signal has a large magnitude, and wherein said additional information is divided into a plurality of sections for combination with said audio signal.

38. An apparatus for recovering additional information that has been divided into a plurality of sections and combined with an audio signal, comprising:

gap detection means for detecting a gap in said audio signal, said gap occurring at a temporal position within said audio signal where said audio signal has a large magnitude;

demodulating means for using said gap as a control signal for decoding the combination of said sections and said audio signal to determine said sections; and correction means for correcting said sections according to information demodulated by said demodulating means.

39. The apparatus as claimed in claim 38, wherein said demodulating means demodulates said additional information according to said control signal even if said audio signal has a reproduction velocity modified.

40. An apparatus for combining additional information with an audio signal and for recovering said additional information from the combination of said additional information and said audio signal, including a combining means and a gap detection means, said apparatus comprising:

gap insert position detection means for detecting a position in said audio signal where a gap can be inserted, said gap corresponding to a temporal location where said audio signal has a large magnitude;

gap insert means for inserting said gap at the insert position detected by said gap insert position detection means;

dividing means for dividing said additional information into a plurality of sections;

combine means using said gap as a control signal for combining said plurality of sections and said audio signal;

gap detection means for detecting said gap;

demodulation means for using said gap as a control signal for decoding the combination of said sections and said audio signal to determine said sections; and correction means for correcting said sections according to information demodulated by said demodulation means.

* * * * *